United States Patent Office 3,560,195
Patented Feb. 2, 1971

3,560,195
N - ALKOXY - 2 - BENZIMIDAZOLE CARBOXIMIDOYL CHLORIDES
George Holan, Brighton, Victoria, and Eva Lea Samuel, Bentleigh, Victoria, Australia, assignors to Monsanto Chemical (Australia) Limited, West Footscray, Victoria, Australia
No Drawing. Filed Sept. 18, 1967, Ser. No. 668,679
Claims priority, application Australia, Sept. 19, 1966, 11,199/66
Int. Cl. A01n 9/22
U.S. Cl. 71—92                                     5 Claims

ABSTRACT OF THE DISCLOSURE

N-alkoxy-2-benzimidazole carboximidoyl chlorides of the formula:

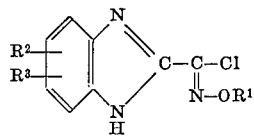

wherein $R^1$ is alkyl of not more than six carbon atoms; $R^2$ and $R^3$ are independently selected from the group consisting of hydrogen, chlorine, bromine, nitro, alkyl of not more than four carbon atoms and alkoxy of not more than four carbon atoms, exhibit herbicidal activity.

---

This invention provides new organic compounds which are useful inter alia as biological toxicants, said compounds being N-alkoxy-2-benzimidazole carboximidoyl chlorides of the formula:

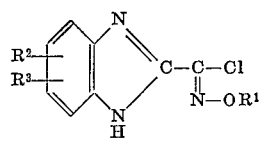

wherein $R^1$ is alkyl of not more than six carbon atoms; and $R^2$ and $R^3$ are independently selected from the group consisting of hydrogen, chlorine, bromine, nitro, alkyl of not more than four carbon atoms and alkoxy of not more than four carbon atoms.

Examples of specific compounds of the above structural formula which are useful for the purpose of the invention are N-methoxy-2-benzimidazole carboximidoyl chloride; N-ethoxy-2-benzimidazole carboximidoyl chloride; N-methoxy-2-(5-chloro) benzimidazole carboximidoyl chloride; N-ethoxy - 2 - (5,6-dichloro) benzimidazole carboximidoyl chloride; N - methoxy - 2-(4-nitro) benzimidazole carboximidoyl chloride; N - methoxy - 2-(5-methyl) benzimidazole carboximidoyl chloride; N-ethoxy-2-(5 - bromo-6 - methyl) benzimidazole carboximidoyl chloride; N - ethoxy - 2-(5 - methoxy) benzimidazole carboximidoyl chloride; and N-methoxy - 2-(5 - chloro - 6-ethoxy) benzimidazole carboximidoyl chloride.

Compounds of the above formula can be prepared by the reaction of 2-trichloromethyl benzimidazole on an alkoxyamine hydrochloride in the presence of a base, as illustrated by the following equation:

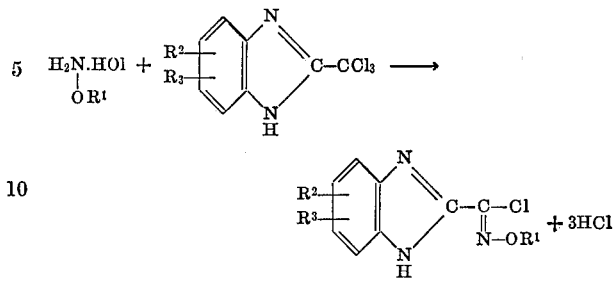

wherein $R^1$, $R^2$ and $R^3$ are as defined above. In general, in practice, the 2-trichloromethyl benzimidazole is added slowly to the alkoxyamine hydrochloride in a solvent such as an alkanol, plus base, in order to avoid excessively high temperatures resulting from the exothermic reaction. The mixture is stirred constantly during the addition and until the reaction is substantially complete. The desired N-alkoxy-2-benzimidazole carboximidoyl chloride can be isolated from the reaction mixture by, if necessary, adjusting the pH to about 8, and filtering. The product can be purified if desired by conventional procedures.

The base used in the process of the invention is not critical, however, weak bases such as sodium carbonate and triethylamine are preferred, since with stronger bases some hydrolysis of starting material will occur. The solvent also is not critical, water; or lower alkanols, such as methanol; or esters, such as ethyl acetate; or ketones, such as acetone; or ethers, such as 1,2-dimethoxyethane, can be used.

Reaction temperature and duration of reaction varies with the nature of the nuclear substituent(s). Electron-withdrawing substituents such as the nitro group tend to retard the reaction and a relatively high temperature is then required for the reaction to be complete within a few hours. On the other hand, electron-donating groups such as halo, alkyl and alkoxy groups facilitate the reaction, which may be then conducted at room temperatures. In general, the reaction is kept as low as possible, as is consistent with obtaining a reasonable reaction rate, in order to minimize the formation of by-products. The present reaction can be conveniently conducted at temperatures in the range 0–100° C., but preferably in the range 10–40° C.

The following practical example is illustrative but not limitative of the process of the invention:

EXAMPLE 1

2 - trichloromethyl benzimidazole (3 g.) was slowly added with stirring to methoxyamine hydrochloride (1 g.) and triethylamine (4 g.) dissolved in methanol (25 ml.). The clear reaction solution was allowed to stand for about sixteen hours, after which it was quenched into water (100 ml.) and the pH adjusted with sodium carbonate solution to about 8. N-methoxy-2-benzimidazole-carboximidoyl chloride was filtered off and recrystallized from cyclohexane to give the product as white needles (1.5 g., 73% yield, M.P. 156° C.).

Microanalysis gave the following results:
Found (percent): C, 51.9; H, 4.0; N, 19.7; Cl, 16.4. $C_9H_8ClN_3$ requires (percent): C, 51.7; H, 3.9; N, 20.0; Cl, 16.8.

The compounds of the present invention have excellent herbicidal activity and can be used by contacting soil containing pre-emergent undesired vegetation, or, contacting undesired post-emergent vegetation, with herbicidal compositions containing at least one N-alkoxy-2-benzimidazole carboximidoyl chloride as specified above, as the essential herbicidal component, in suitable concentration for the purpose, such herbicidal compositions generally containing from about 0.5% to about 95% by weight of the active compound. These herbicidal compositions or formulations can be prepared by admixing the active compound or a mixture of such compounds with a liquid or solid adjuvant. The term "adjuvant" as used herein and in the appended claims connotes diluents, extenders, carriers, surface active agents and solvents to provide compositions in the form of finely divided particulate solids, granules, pellets, solutions, suspensions, dispersions or emulsions, the resultant compoitions being ready for application to soil containing undesired pre-emergent or post-emergent vegetation, using conventional equipment for the purpose. Thus, the herbicidal compositions or formulations can be prepared in the form of solids or liquids.

In general the toxicant N-alkoxy-2-benzimidazole carboximidoyl chloride utilized in accordance with the invention are solids only slightly soluble in water, but readily soluble in hydrocarbon solvents such as kerosene, toluene or heavy aromatic naphthenes. When dissolved in such solvents the said toxicants may be readily emulsified with water by the addition of appropriate conditioning agent and sprayed onto the soil surface, using water as the carrier. Alternatively, the said toxicants may be intimately mixed with a surface active agent, with or without diluents, and then can be readily suspended in water and applied in water. Alternatively, the said toxicants may be applied to the soil surface as a solid either in finely divided powder form or in granular form, with the optional use of an inert ingredient as a filler.

Solid compositions may be prepared in the form of ready-to-use compositions, such as dust mixtures prepared by admixing the active material with finely-divided inert carriers to give a homogeneous free-flowing composition suitable for direct application to soil or plants. The finely-divided inert carrier may be chosen from such materials as talc, clay, bentonite, pumice, fuller's earth, pyrophyllite and diatomaceous earth, or flours such as walnut shell, wheat, redwood, soya bean, cottonseed, or other inert dust materials conventionally employed in preparing herbicidal compositions in powder form. Alternatively, the active compound may be applied as a solution in a suitable organic solvent such as kerosene, xylene, toluene and other aromatic petroleum solvents. The ready-to-use dusts and solutions may contain from about 90 to 98% by weight of inert diluent or solvent.

The active material can also be formulated as a concentrate composition, suitable for dilution with water, before application to soil or plants. Such formulations may be in the form of finely-divided solids which disperse in water to give finely-divided stable suspensions, or they may be in the form of liquid compositions consisting of active material in a water-immiscible organic solvent carrier which can be easily emulsified in water to form a stable emulsion. The former is a water-dispersible powder concentrate, while the latter is a water-emulsifiable concentrate. Both types of concentrate may contain from about 10% to about 90% of active material depending on the nature of the application and the activity of the herbicidal compound. Such herbicidal concentrates may also contain organic surface active agents of the kind sometimes referred to in the art as wetting, dispersing or emulsifying agents. These surface active agents have several functions, such as causing the compositions to be easily dispersed or emulsified in water to give aqueous sprays (which for the most part constitute desirable media for most applications) or assist in wetting the surfaces of the soil or undesired plants to which the formulation is applied. The organic surface active agents employed can be of the anionic, cationic or nonionic type. Generally the surface active agents will be present only in minor proportions of the formulations, for example, less than 15% and frequently as low as 0.1% by weight of the composition. Usually concentrations of from 0.5 to 10% are found to be most useful.

Thus, the active compound can be incorporated into absorbent materials such as clays, fuller's earth and the like, together with wetting agents such as sodium alkyl naphthalene sulfonates and dispersing agents such as the sodium lignin sulfonates to produce a water-dispersible powder concentrate which can be suspended in water and sprayed onto the soil. Emulsifiable herbicidal concentrate off the active compound can likewise be formulated, for example, using kerosene or xylene or toluene or a high aromatic naphtha as solvent, together with an emulsifying agent which may be of the nonionic type, e.g. octyl- or nonyl-phenol ethylene oxide condensates, or, more preferably, blends of nonionic type surface active agents with oil soluble anionic surface active agents, such as the calcium salt of an aryl alkyl sulfonate. A blend known as "Emcol H 500 X" gives particularly good results.

Examples of herbicidal concentrates formulated in accordance with the invention are as follows:

(1) Dispersible powder concentrates

| | Percent w./w. |
|---|---|
| Active compound | 40 |
| Belloid NW [1] | 1 |
| Lissatan AC [2] | 2 |
| Clay (kaolin) | 47 |
| Bentonite | 10 |

(2) Emulsifiable concentrates

| | Percent w./v. |
|---|---|
| Active compound | 40 |
| Emcol H 500 X [3] | 10 |
| Xylene to 100% by volume. | |

[1] Product of Geigy, Switzerland.
[2] Product of Imperial Chemical Industries, England.
[3] Product of Emulsol Corp., U.S.A.

These concentrates can be readily mixed with water as a carrier and sprayed onto weeds or the soil for the purpose of the invention.

We have established that for effective pre-emergent control of grasses, amounts within the range 0.5–60 lb./acre of active compound and preferably 1–25 lb./acre can be used with advantage. Examples of grasses which are controlled are wild oat, brome grass, rye grass, foxtail and crab grass, broadleaved plants including radish, sugar beet, cotton, pigweed, soya bean, wild buckwheat and tomato have been effected to varying degrees. At rates of application 25–100 lb. per acre the active compound prevents almost all plant emergence.

The contact herbicidal activity of N-methoxy-2-benzimidazole-carboximidoyl chloride was determined in greenhouse tests, in which a specific number of seeds of a number of various plants, each representing a principal botanical type, were planted in greenhouse flats, as follows: A good grade of top-soil was placed in aluminum pans and compacted to a depth of ⅜ to ½ inch from the top of the pan. On the top of the soil was placed a predetermined number of seeds of various plant species. The seeds were covered by over-filling the pans with soil and striking them level. The pans were then moved into a greenhouse bench where they were watered from below as needed to give adequate moisture for germination and growth.

When the plants were 21 days old, each aluminum pan was sprayed with a given volume of a 0.5% concentration solution of the specified compound, corresponding to a given lb./acre rate of application. The solution was prepared from an aliquot of a 2% solution of the candidate compound in an extending agent such as acetone, a known amount of cyclohexanone/emulsifying agent mix, and sufficient water to make up to volume.

After 14 days, the pans are observed and all plant injury and abnormalities recorded. The phytotoxic rating of the specified compound is obtained by means of a fixed scale based on the average injury inflicted on each plant lot. The rating is summarized as follows:

0—No injury
1—Slight injury
2—Moderate injury
3—Severe injury
4—Complete kill.

The following table demonstrates the contact herbicidal effect of N - methoxy - 2 - benzimidazole carboximidoyl chloride applied at a rate of 10 lb./acre:

| Plant species: | Rating |
|---|---|
| Morning glory | 4 |
| Wild oat | 4 |
| Brome grass | 3 |
| Rye grass | 3 |
| Radish | 4 |
| Sugar beet | 4 |
| Foxtail | 4 |
| Crab grass | 4 |
| Pigweed | 4 |
| Soybean | 4 |
| Wild buckwheat | 4 |
| Tomato | 4 |
| Sorghum | 4 |

The 2-trichloromethyl benzimidazoles used in the preparation of the compounds of the present invention can be prepared by the reaction of a mono-salt of an appropriately substituted o-phenylenediamine with an alkyl trichloroacetimidate, as illustrated in the following equation:

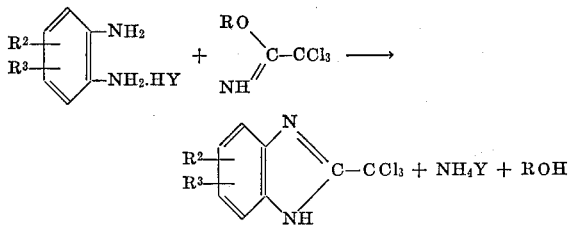

wherein $R^2$ and $R^3$ are as defined above, wherein Y denotes the radical of a mineral acid, preferably hydrochloric acid or sulfuric acid, and wherein R denotes an alkyl group, preferably having fewer than five carbon atoms. The two components are mixed together, conveniently in a suitable solvent or diluent. Suitable solvent or diluent. Suitable solvents are ethers, such as dioxan, diethyl ether, 1,2-dimethoxyethane; esters, for example, ethyl acetate; and alcohols such as methanol or ethanol. The convenient procedure is to add the alkyl trichloroacetimidate gradually to a solution or suspension of the phenylenediamine salt. The preferred temperature of reaction and the duration of reaction varies appreciably with the nature of the nuclear substituents denoted by $R^2$ and $R^3$. Electron-donating groups such as alkyl and alkoxy favor the reaction, which then occurs readily at room temperature, in some cases cooling being required as the reaction is exothermic. On the other hand, electron-attracting groups such as halogen retard the reaction and a temperature of 40–50° C. is required for the reaction to be complete within a satisfactory time. The reaction product is isolated and purified by conventional procedure.

Preparation of said 2-trichloromethyl benzimidazoles is illustrated in the following non-limitative practical examples:

EXAMPLE 2

Methyl trichloroacetimidate (0.1 mole) was added to a solution of o-phenylenediamine hydrochloride (0.1 mole) in dry methanol (150 ml.). An exothermic reaction occurred and a solid began to precipitate in half an hour. The reaction was completed in about 2 hours when the mixture was poured into water to give 2-trichloromethyl benzimidazole in 85% yield. This white crystalline solid was recrystallized from glacial acetic acid, dioxan, xylene or chloroform. The material had no melting point up to 360° C. and was identified by infra red (C–Cl peak at 820 cm.$^{-1}$ and ultra violet spectra max. at 284 and 224 m$\mu$) with the following microanalytical figures:

Found (percent): C, 40.5; H, 2.4; N, 12.2; Cl, 45.5. $C_8H_5Cl_3N_2$ requires (percent): C, 40.8; H, 2.1; N, 11.8; Cl, 45.2.

The methyl trichloroacetimidate starting material can be prepared from trichloroacetonitrile and methanol in the presence of anhydrous potassium carbonate by the method of Cramer, Ber., 1958, 91, 1049. The product so prepared was obtained in 90% yield and had B.P. 148° C., $n_D^{25}$ —1.4785, $d_{25}$ —1.45.

EXAMPLE 3

4-chloro-o-phenylenediamine monohydrochloride (0.02 mole) was reacted with methyl trichloroacetimidate (0.02 mole) by allowing them to stand overnight in dry methanol at room temperature. This mixture on quenching gave crude 2-trichloromethyl-5(6)-chlorobenzimidazole in 55% yield with 5% contaminate. The latter was removed by dissolving the mixture in acetic acid, filtration of the insoluble contaminate and aqueous quenching to give the desired compound. Several recrystallizations from xylene gave an analytically pure white crystalline material, M.P. 235° C. (I. R. spectrum aliphatic C–Cl 820 cm.$^{-1}$ aromatic C–Cl 810 cm.$^{-1}$).

Found (percent): C, 36.1; H, 1.8; N, 10.4; Cl, 52.3. $C_8H_4Cl_4N_2$ requires (percent): C, 35.7; H, 1.5; N, 10.4; Cl, 52.4.

The 4-chloro-o-phenylenediamine monohydrochloride starting material can be prepared from the purified base by addition of hydrochloric acid in methanol and precipitation of the salt with petroleum ether.

EXAMPLE 4

Methyl trichloroacetimidate (0.01 mole) was added to a suspension of 4,5-dimethyl-o-phenylenediamine monohydrochloride (0.01 mole) in dimethoxyethane (80 ml.). No apparent reaction took place and the mixture was allowed to stand at room temperature for 6 days. At the end of this period, filtration of the insoluble materials showed it to contain about 50% of the starting hydrochloride. Addition of petroleum ether (40–60° C.) to the filtrate precipitated an oily material, which was filtered off and the filtrate was evaporated to give crude 2-trichloromethyl-5,6-dimethylbenzimidazole in 35% yield. The crude material was recrystallized three times from benzene to give a white crystalline material having a M.P. 190° C. After 4 hours drying at 80° C. under vacuum, analysis showed the material to contain ⅓ molecule of benzene of crystallization.

Found (percent): C, 50.5; H, 3.8; N, 9.5; Cl, 36.9. $C_{10}H_9N_2Cl_3 \cdot \frac{1}{3}C_6H_6$ requires (percent): C, 49.8; H, 3.8; N, 9.6; Cl, 36.8.

After further two recrystallizations from benzene the material with M.P. 190° C. was dried for 4 hours at 100° C. under vacuum. Analysis showed that it now contained ⅙ molecule of benzene of crystallization.

Found (percent): C, 47.6; H, 3.7; N, 10.1; Cl, 38.7. $C_{10}H_9N_2Cl_3 \cdot \frac{1}{6}C_6H_6$ requires (percent): C, 47.7; H, 3.7; N, 10.1; Cl, 38.5.

The 4,5-dimethyl-o-phenylenediamine monohydrochloride starting material can be prepared by the addition of hydrochloric acid to the base dissolved in ethyl acetate, followed by precipitation of the salt with petroleum ether.

This starting material has a M.P. 225° C. and has only slight solubility in the usual solvents.

EXAMPLE 5

Methyl trichloroacetimidate (26.0 g., 0.15 mole) was added to a solution of 3,4-diaminotoluene hydrochloride (24.0 g., 0.15 mole) in 1,2-dimethoxyethane (400 ml.) at room temperature, and left overnight. Ammonium chloride was then filtered off and petroleum ether (B.P. 40–60° C.) was added to the filtrate to precipitate by-products. These were filtered off and the solution was evaporated to give 5-methyl-2-trichloromethyl benzimidazole in 60% yield. After recrystallization from benzene, the solid had M.P. 187° C.

Found (percent): C, 42.9; H, 2.9; N, 11.0. $C_9H_7N_2Cl_3$ requires (percent): C, 43.2; H, 2.8; N, 11.2.

Various changes and modifications of this invention can be made, and, to the extent that such variations incorporate the spirit of this invention, they are intended to be included within the scope of the appended claims.

The embodiments of the invention in which an exclusive property or privilege is claimed are defined as follows:

1. A method of controlling the growth of vegetation which comprises applying thereto a herbicidal amount of at least one N-alkoxy-2-benzimidazole carboximidoyl chloride of the formula:

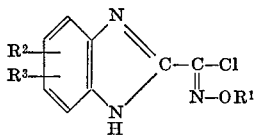

wherein $R^1$ is alkyl of not more than six carbon atoms; and $R^2$ and $R^3$ are independently selected from the group consisting of hydrogen, chlorine, bromine, nitro, alkyl of not more than four carbon atoms and alkoxy of not more than four carbon atoms.

2. A method in accordance with claim 1 wherein the N-alkoxy-2-benzimidazole carboximidoyl chloride is applied to the foliage of the vegetation.

3. A method in accordance with claim 1 wherein the N-alkoxy-2-benzimidazole carboximidoyl chloride is applied to soil containing pre-emergent vegetation.

4. A herbicidal formulation comprising a herbicidal amount of at least one N-alkoxy-2-benzimidazole corboximidoyl chloride of the formula:

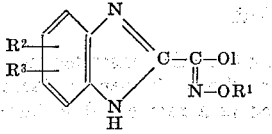

wherein $R^1$ is alkyl of not more than six carbon atoms; and $R^2$ and $R^3$ are independently selected from the group consisting of hydrogen, chlorine, bromine, nitro, alkyl of not more than four carbon atoms and alkoxy of not more than four carbon atoms; in admixture with an adjuvant.

5. A herbicidal formulation in accordance with claim 4 wherein the adjuvant comprises a surface active agent.

References Cited
UNITED STATES PATENTS
3,325,271   6/1967   Goldsmith et al.   71—92X JAMES O. THOMAS, Jr., Primary Examiner U.S. Cl. X.R.

260